UNITED STATES PATENT OFFICE.

JAMES TURNER, OF NEW YORK, N. Y.

COMPOSITION FOR LUBRICATING.

Specification forming part of Letters Patent No. 39,185, dated July 7, 1863; Reissue No. 1,577, dated November 24, 1863.

*To all whom it may concern:*

Be it known that I, JAMES TURNER, of the city, county, and State of New York, have invented a new and Improved Lubricating Compound; and I do hereby declare that the following is a full, clear, and exact description of the same.

This invention consists in mixing together paraffine, or the heavy oil contained in petroleum, and red oil, or residuum from the fat or other material used in the manufacture of candles, with lime-water or other alkaline lye and sawdust in such manner that by the action of the red oil the mixture of paraffine or heavy oil and lime-water or alkaline lye is made to harden, and by the sawdust the lubricating qualities of the fats are retained, and a compound is produced which can be used with great advantage and economy for lubricating axles and heavy gearing.

The proportion in which I mix the ingredients of my compound together is about as follows: paraffine, or the heavy oil contained in petroleum, ten gallons; red oil, or the residuum from candles, two gallons; lime-water or alkaline lye, six gallons; sawdust, four to five gallons.

The red oil which I use forms a substitute for the resin-oil which formerly has been used in similar compounds, and it serves to thicken or harden the mixture of the paraffine or heavy oil and lye. Without the use of the red oil the mixture of the oil and lye remains limpid and difficult to put up and to transport. Aside from the present high price of resin-oil, the red oil is superior to said resin-oil, because it does not contain that gummy substance which renders the use of resin-oil objectionable for lubricating purposes. The red oil is obtained in the maufacture of candles in the following mannner: Take any fat, heat to about 200°, then put it in an acidifier and raise the heat to 350°, add seven to nine per cent. of sulphuric acid till all the strong smell has evaporated, then pan it into a still, and let it stand for about ten days. The solid product obtained by this process is pressed and manufactured into candles. The liquid running from it is suitable for my compound after standing a few days. Instead of this process, the fat may, however, be treated in the following manner: Take one thousand pounds pressed stearine or good tallow, heat to about 150° to 200°, then add an equal quantity of lime-water made about as thick as paste or thick whitewash, boil together about six hours, then remove it into an earthen vessel, add a quantity of water equal, or nearly so, in bulk to the material already in the saponifying vessel, then add about fifteen per cent., by weight, of sulphuric acid, let it stand six hours, then bail off the candle-stock into tubes, and separate by pressing, as previously stated. The liquid residuum obtained in either case constitutes the red oil which I use for my compound. The paraffine and red oil are stirred together and well mixed with the sawdust before the lye is added. The sawdust becomes thoroughly satuarated with the grease, and by the addition of the lime-water or alkaline solution the mass is saponified and brought in such a state that it can be conveniently kept in wooden boxes or other suitable packages. It must be remarked, however, that this saponification is due entirely to the red oil mixed with the paraffine or heavy oil. The latter alone would not saponify.

This lubricating compound is applied to heavy machinery and gearing in general in the ordinary manner, and by the sawdust the lubricating qualities of the fats are retained, and the compound is rendered very economical and cheaper than lubricators of the ordinary composition.

What I claim as new, and desire to secure by Letters Patent, is—

1. A lubricating compound made of the ingredients herein specified, and mixed together in the manner and about in the proportion set forth.

2. The use of red oil, or the residuum obtained in the manufacture of candles, in combination with paraffine, or the heavy oil of petroleum, and lime-water or alkaline lye, substantially as and for the purposes herein described.

3. The use of sawdust, in combination with fatty substances and alkaline lye or lime-water, as and for the purpose specified.

JAMES TURNER.

Witnesses:

M. M. LIVINGSTON,

I. W. COOMBS.